US007634844B2

(12) United States Patent
Szewc et al.

(10) Patent No.: US 7,634,844 B2
(45) Date of Patent: Dec. 22, 2009

(54) ADJUSTABLE PREWINDER ASSEMBLY FOR WIRE INSERT INSTALLATION TOOL

(75) Inventors: Jan Szewc, Roxbury, CT (US); William J. Lutkus, Watertown, CT (US); William Giannakakos, Danbury, CT (US)

(73) Assignee: Newfrey LLC, Newark, DE (US)

( * ) Notice: Subject to any disclaimer, the term of this patent is extended or adjusted under 35 U.S.C. 154(b) by 119 days.

(21) Appl. No.: 11/407,402

(22) Filed: Apr. 19, 2006

(65) Prior Publication Data

US 2007/0245533 A1 Oct. 25, 2007

(51) Int. Cl.
*B23P 19/04* (2006.01)

(52) U.S. Cl. ........................................ 29/240.5; 29/227

(58) Field of Classification Search .................. 269/70, 269/249; 81/57.37, 434, 177.9, DIG. 5, 57.11; 29/240.5, 227
See application file for complete search history.

(56) References Cited

U.S. PATENT DOCUMENTS 2,316,231 A 4/1943 Evans
2,371,622 A 3/1945 Hawkins
2,390,545 A 12/1945 Lang
2,400,548 A 5/1946 Geertsema
2,453,840 A * 11/1948 Geertsema ................. 29/240.5
2,584,118 A * 2/1952 Forster ...................... 29/240.5
2,586,805 A 2/1952 Forster
2,731,992 A * 1/1956 Lozon ......................... 269/70
2,855,661 A 10/1958 Forster
2,997,782 A 8/1961 Eddy
3,052,972 A 9/1962 Steinmeyer
3,093,895 A 6/1963 Eddy
3,111,751 A 11/1963 Eddy
3,348,293 A 10/1967 Newton et al.
3,357,698 A * 12/1967 Flynn ......................... 269/249
3,579,793 A * 5/1971 Williams et al. ........... 29/240.5
3,602,975 A 9/1971 Thurston et al.
4,172,314 A 10/1979 Berecz et al.
4,528,737 A 7/1985 Cosenza et al.
4,553,302 A 11/1985 Cosenza et al.
4,553,303 A 11/1985 Yamamoto
4,768,270 A 9/1988 Czarnowski
4,980,959 A 1/1991 Czarnowski
5,212,865 A 5/1993 Davis et al.
5,456,145 A 10/1995 Cosenza
6,000,114 A 12/1999 Newton et al.
6,321,433 B1 11/2001 Cliff et al.

(Continued)

*Primary Examiner*—Lee D Wilson
(74) *Attorney, Agent, or Firm*—Harness, Dickey & Pierce, P.L.C.

(57) ABSTRACT

A prewinder apparatus attached to a drive tool to install helical coil inserts includes an adapter attached to the drive tool. A rotatable tubular sleeve in the adapter is engaged with the tool drive and has opposed engagement walls of a longitudinal slot extending through a hollow portion. A mandrel has a threaded first end and a pin transversely extending from a second end positioned within the longitudinal slot. A stop slides within the adapter member and rotatably receives the sleeve. The stop has a plurality of external threads. A stop regulator rotatably disposed in the adapter member has internal threads engaged with the stop external threads. The stop is axially displaceable within the adapter member and infinitely positionable along the stop external threads by manually rotating the stop regulator. A ball or male detent member biased to engage detent cavities of the stop regulator provides predetermined stop axial displacement.

16 Claims, 15 Drawing Sheets

U.S. PATENT DOCUMENTS

| | | | | |
|---|---|---|---|---|
| 6,367,138 | B1 | 4/2002 | Newton et al. | |
| 6,470,557 | B2 | 10/2002 | Newton et al. | |
| 6,704,984 | B2 | 3/2004 | Szewc et al. | |
| 6,860,173 | B2 * | 3/2005 | Newton et al. | 81/57.11 |
| 2004/0187288 | A1 | 9/2004 | Bruehwiler et al. | |
| 2007/0245533 | A1 * | 10/2007 | Szewc et al. | 29/240.5 |

* cited by examiner

ADJUSTABLE PREWINDER ASSEMBLY FOR WIRE INSERT INSTALLATION TOOL

FIELD

The present disclosure relates to devices and methods for installing helically coiled inserts.

BACKGROUND

The statements in this section merely provide background information related to the present disclosure and may not constitute prior art.

Helically coiled wire inserts both of tanged or tangless design can be inserted using hand tools, electrical, battery powered, or pneumatic tools. Coarse thread size inserts, such as thread sizes 4-40, 6-32, 10-24, ¼-20, etc., are relatively stiff or rigid and can be installed using a predetermined mandrel. Fine thread size inserts, however, such as for thread sizes 4-48, 6-40, 8-36, 10-32, ¼-28, etc., are commonly flexible and may not retain their shape during installation. Fine thread size inserts therefore commonly require a pre-winder to be used in conjunction with a mandrel to help reduce the outside diameter of the inserts and to align the coils of the wire insert to the correct pitch so they can be more easily installed into a tapped aperture of for example a work piece or fastener body. Pre-winders are known for use with hand tools, electric, battery operated, and/or pneumatic power tools, however known pre-winders for these tools for the installation of helically coiled inserts often also require spacers or shims to accommodate differences in insert length or installation depth. Installation of spacers or shims normally requires stocking multiple sizes of parts, with associated additional part costs, time delay in their installation, and defective parts which do not receive the properly installed insert.

The installation of spacers or shims commonly requires disassembly of the tool or prewinder followed by installation of the necessary spacers or shims. The disassembly time further adds costs and time delay to completion of the component. The tool must then be reassembled and tested with the shims and spacers installed. If proper installation depth is not achieved, the process must be repeated until the appropriate shims or inserts are installed to provide the desired coil installation depth. This repetition further increases costs and time delays.

SUMMARY

According to several embodiments of an adjustable prewinder assembly for a wire insert installation tool of the present disclosure, a prewinder apparatus is selectively attachable to a drive tool for installation of a helical coil insert. The prewinder apparatus includes an adapter member attachable to the drive tool. A stop regulator is both axially restrained and rotatably disposed within the adapter member, the stop regulator having an axially threaded through aperture defining a plurality of internal threads. A stop is threadably received within the stop regulator, the stop having a flange defining a stop face and a substantially tubular body extending from the flange having a plurality of external threads on the tubular body and a smooth wall internal aperture extending throughout a length of the stop member. The external threads are engageable with the internal threads of the stop regulator permitting infinitely adjustable axial displacement of the stop member along a length of the internal threads by manual rotation of the stop regulator. A tubular sleeve rotatably disposed in the internal aperture has an engagement end engaged with a drive element of the tool and a hollow portion having a longitudinal slot extending away from the engagement end. A mandrel slidably disposed within the hollow portion of the sleeve has a threaded first end adapted to engage the helical coil insert and a pin transversely extending from a second end positioned within the longitudinal slot. The mandrel is axially displaceable until the pin contacts the stop face defining a selectable displacement of the threaded first end.

According to further embodiments, a prewinder apparatus includes an adapter member having a first end attachable to the drive tool and an opposed second end. A prewinder is attached to the second end of the adapter member and includes a first threaded aperture. A sleeve rotatably disposed in the adapter member has an engagement portion engaging a drive element of the tool, and a substantially hollow second portion having opposed engagement walls defining a longitudinal slot extending away from the engagement end. A mandrel is positioned within the sleeve and is axially displaceable through the first threaded aperture in each of an advancing and a retracting direction by rotation of the mandrel. A regulator member rotatably disposed in the adapter member is engageable to rotate the sleeve. The regulator member is manually rotatable to define a predetermined extension of the mandrel and defining a depth of engagement of the helical coil insert in the receiving member. A plurality of detent cavities are spaced about the regulator member. A ball is disposed in the ball receiving cavity of the adapter member and biased for releasable engagement into individual ones of the detent cavities, each defining an incremental change in the depth of engagement.

According to still further embodiments, a stop member is disposed in the adapter and rotatably receives the sleeve. The stop member has a plurality of external threads and a stop face. A stop regulator rotatably disposed in the adapter member has internal threads engageable with the external threads of the stop member. The stop member is axially displaceable by the stop regulator by manual rotation of the stop regulator engaging the external threads of the stop member. A longitudinal displacement of the mandrel is predetermined by rotation of the stop regulator engaging the threads of the stop member to longitudinally displace the stop and stop face. Contact between the pin and the stop face defines an insertion depth of the helical coil insert.

According to yet still further embodiments, a method for inserting a helically coiled insert into a receiving member includes a step for rotatably disposing the sleeve, the stop, and the regulator member in the adapter member. The method further includes engaging the mandrel to the sleeve for longitudinal displacement of the mandrel in the sleeve in each of an advancing and a retracting direction. The method also includes attaching the first end of the adapter member to the drive tool to engage the sleeve with the drive element of the tool. The method still further includes manually rotating the regulator member to longitudinally displace the stop to a predetermined position defining an installation depth of the helical coil insert in the receiving member. The method yet further includes driving both the sleeve and the mandrel using the drive tool to displace the mandrel through the first threaded aperture to threadably engage the helically coiled insert in the receiving aperture of a workpiece.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
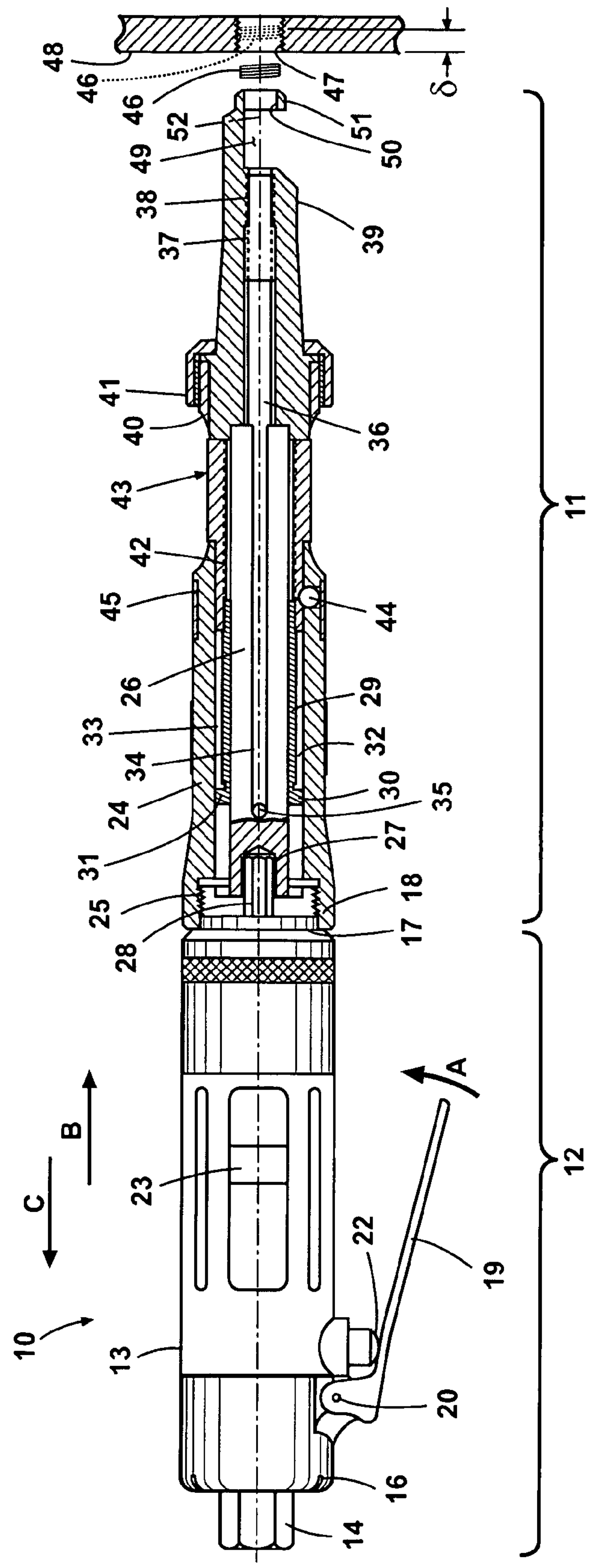
FIG. 1 is a partial cross sectional front elevational view of an adjustable prewinder assembly for wire insert installation tool according to several embodiments of the present disclosure.

The following description is merely exemplary in nature and is not intended to limit the present disclosure, application, or uses. It should be understood that throughout the drawings, corresponding reference numerals indicate like or corresponding parts and features.

According to several embodiments of the present disclosure and referring generally to FIG. 1, a pre-winder/tool 10 includes a pre-winder assembly 11 engaged by a threaded connection to a tool 12. Tool 12 can be any type of tool including electrical tools, pneumatic tools, battery operated tools and the like. In the example shown, tool 12 is a pneumatically operated tool having a tool grip portion 13. A power source connection 14 which in several embodiments includes at least one pneumatic fluid source connector is provided in a handle end 16 of tool grip portion 13. Tool 12 further includes a tool connecting end 17 which is adapted for engagement to a pre-winder connection end 18 of pre-winder assembly 11. Tool 12 can further include an actuator 19 which can be rotatably connected to tool grip portion 13 using a pinned connection 20 for rotation about an actuation arc "A". Rotation of actuator 19 engages a switch 22 to operate tool 12 in either of a tool advancing direction "B" or a tool retraction direction "C". The direction of tool operation can be selectable using a direction selector 23 or can be automatically controlled, for example using a clutch.

Pre-winder assembly 11 can include an adapter 24 defining in several embodiments a threaded connection 25 with tool 12. Threaded connection 25 can be a female-to-male connector as shown or in several other embodiments can be a male-to-female connector. The invention is not limited to the type of connection used between pre-winder assembly 11 and tool 12, therefore additional mechanical type connections can be used of a non-threaded design, including fasteners, clips, and the like. A sleeve 26 is rotatably disposed within adapter 24. Sleeve 26 includes a mating connection 27 which engages a drive element 28 of tool 12. In several embodiments, drive element 28 is a hex-shaped shaft, therefore mating connection 27 includes a female hex-shape adapted to engage with the hex-shaped shaft. Other shapes or designs of drive element 28 can also be used including splines, spade, or other geometric shapes, having mating connection 27 adapted accordingly.

A stop 29 is disposed about the outer diameter of sleeve 26 and within adapter 24 allowing sleeve 26 to rotate within stop 29 when driven by drive element 28. Stop 29 includes each of a first male key 30 and a second male key 31 which are non-rotatably received in each of a corresponding first and second key slot 32, 33 created within adapter 24. First and second male keys 30, 31 prevent rotation of stop 29 while allowing stop 29 to translate longitudinally within adapter 24. First and second male keys 30, 31 can be generally rectangular in shape as shown, or can also be created in other geometric shapes, including but not limited to rounded, dovetail, and the like.

Sleeve 26 further includes a pin slot 34 which receives a pin 35 engaged with a mandrel 36. Mandrel 36 is slidably disposed within sleeve 26 such that rotation of drive element 28 rotates sleeve 26 to engage pin 35. As sleeve 26 rotates, a threaded end 37 of mandrel 36 which is induced to rotate by contact with pin 35 within pin slot 34 is threadably displaced in either tool advancing direction "B" or retraction direction "C" within a threaded portion 38 of a pre-winder 39. Rotation of sleeve 26 therefore rotates mandrel 36 and threaded end 37 of mandrel 36 displaces mandrel 36 longitudinally.

Pre-winder 39 is mechanically connected to a coupling end 40 of adapter 24 using a coupling retainer 41. A stop regulator 42 is also positioned for rotation within adapter 24. Stop regulator 42 is internally threaded throughout its length to receive an external thread of stop 29. Stop regulator 42 includes a knurled outer diameter 43 which is accessible to the operator of pre-winder/tool 10 to manually rotate the stop regulator 42. By manually rotating stop regulator 42, the internal threads of stop regulator 42 engage the external threads of stop 29 to longitudinally displace stop 29 to a desired axial/longitudinal position. A ball 44 made for example of a metal such as steel is positioned in an aperture of adapter 24 and retained by a biasing ring 45 substantially enclosing adapter 24. The axial/longitudinal positioning of stop 29 provides a predetermined axial displacement of mandrel 36 which corresponds to a depth of engagement δ of a helically coiled insert 46 into a threaded aperture 47 of a receiving part 48.

Ball 44 is biased into releasable engagement with stop regulator 42 at predetermined intervals defining incremental displacement distances of mandrel 36 which will be described in further detail in reference to FIGS. 11, 12, 20, and 21. Pre-winder/tool 10 can be used to install coiled insert 46 into threaded aperture 47 of receiving part 48 to varying depths of engagement δ depending on several factors including but not limited to the size of coiled insert 46, a thickness of receiving part 48, and the strength of the joint required. Receiving part 48 is shown as a plate, however receiving part 48 can be any item such as a sheet, flange, fastener, or the like. Threaded aperture 47 can be a through aperture or a blind aperture.

Pre-winder/tool 10 is used by first positioning coiled insert 46 in a cavity 49 of pre-winder 39 and operating tool 12 to displace mandrel 36 in tool advancing direction "B" until the threaded end 37 of mandrel 36 internally engages coiled insert 46. Further operation of tool 12 translates mandrel 36 with coiled insert 46 attached into a coil reducing aperture 50 of a coil reducing member 51 extending distally from pre-winder 39. Coil reducing aperture 50 both reduces the diameter and pre-aligns the thread pitch of coiled insert 46 for easier insertion into threaded aperture 47. The pre-winder/tool 10 is then aligned along a longitudinal axis 52 of threaded aperture 47 and further operated to insert coiled insert 46 into threaded aperture 47 using threaded end 37 of mandrel 36. Once the predetermined depth of installation of coiled insert 46 is reached, which was predetermined by rotation of knurled outer diameter 43 of stop regulator 42, further displacement of mandrel 36 in advancing direction "B" is prevented by stop 29. At this time, either the operator manually or the tool 12 automatically reverses direction to withdraw mandrel 36 from threaded aperture 47. During insertion of coiled insert 46, its diameter which was reduced by passage through coil receiving aperture 50 is released and expands to engage the threads of threaded aperture 47, which prevents the withdrawal of coiled insert 46 as threaded end 37 of mandrel 36 is withdrawn.

Referring now generally to FIGS. 2 through 5, adapter 24 further includes an end face 53 which is adapted to engage tool connection end 17 of tool 12. This positive engagement of end face 53 provides a rigid, releasable connection between tool 12 and pre-winder assembly 11. A female thread 54 created within a bore 55 of pre-winder connection end 18 engages a corresponding male thread of tool 12. A knurled portion 56 is created on an outer diameter of adapter 24 proximate to pre-winder connection end 18. Knurled portion 56 is manually grasped by the operator of pre-winder/tool 10 to positively rotate and engage pre-winder assembly 11 onto tool 12.

In several embodiments, ball cavity 57 is created in adapter 24 to receive ball 44. A recess 58 is circumferentially created about adapter 24 proximate ball cavity 57 to receive biasing ring 45. At an opposite end of adapter 24 from pre-winder connection end 18 is a pre-winder abutting end 59. Abutting end 59 is adapted to receive pre-winder 39 by engagement with a threaded section 60 of coupling retainer 41. A main body 61 of adapter 24 is machined or otherwise adapted to provide at least one and in several embodiments a pair of opposed first and second window openings 62, 64 through which knurled outer diameter 43 of stop regulator 42 is accessible. Stop regulator 42 can rotate within but is bounded or physically prevented from axial travel when positioned within the first and second window openings 62, 64 by material at opposed ends of the first and second window openings 62, 64. The knurled outer diameter 43 of stop regulator 42 can be grasped through the first and second window openings 62, 64 to manually rotate stop regulator 42. A stop receiving bore 66 is also created in adapter 24 which slidably receives stop 29.

Adapter 24 has an adapter length "D". End face 53 has a clearance bore "E" adapted to receive the male threaded end of tool 12 to allow engagement with female thread 54. Clearance bore "E" has a clearance bore depth "F" and female thread 54 is extended within clearance bore "E" to a total thread depth "G" which is less than a total bore depth "H" to allow full thread engagement of threaded connection 25. A window spacing "J" is provided to provide manual contact with knurled outer diameter 43 of stop regulator 42. A through-aperture internal diameter "K" is sized to slidably receive stop regulator 42.

A connection end diameter "L" is provided for pre-winder connection end 18, and a tool grip diameter "M" is provided for knurled portion 56. At pre-winder abutting end 59, a thread length "N" is provided for the male threads of threaded section 60. A depth "P" is provided from pre-winder abutting end 59 to the ends of the first and second key slots 32, 33 defining a first end face 68. A stop regulator receiving bore 70 having a stop regulator receiving diameter "Q" is provided for the total depth "P". As best seen in reference to FIG. 5, the combination of first and second key slots 32, 33 define a total keyway spacing dimension "R", and ball cavity 57 defines a ball aperture diameter "S".

In several exemplary embodiments of the present disclosure, adapter length "D" is approximately 4.9 in (12.45 cm), clearance bore "E" is approximately 1.07 in (2.72 cm), clearance bore depth "F" is approximately 0.125 in (0.32 cm), total thread depth "G" is approximately 0.5 in minimum (1.27 cm), and total bore depth "H" is approximately 0.75 in (1.9 cm). Window spacing "J" is approximately 0.84 in (2.13 cm), through-aperture internal diameter "K" is approximately 0.75 in (1.90 cm), connection end diameter "L" is approximately 1.25 in (3.17 cm), and tool grip diameter "M" is approximately 1.125 in (2.86 cm). Depth "P" is approximately 1.54 in (3.91 cm), thread length "N" is approximately 0.375 in (0.95 cm), stop regulator receiving diameter "Q" is approximately 0.87 in (2.21 cm), total keyway spacing "R" is approximately 0.87 in (2.21 cm), and ball aperture diameter "S" is approximately 0.19 in (0.48 cm). These dimensions represent several embodiments of the present invention and do not limit the invention. Any of the above dimensions can be modified to suit the tool 12 to which pre-winder assembly 11 is attached or to change the size of coiled insert 46.

Figure 7:
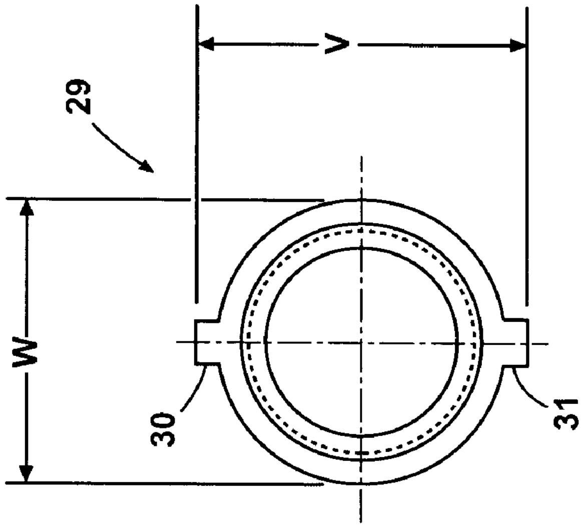
FIG. 7 is an end elevational view of the stop member of FIG. 6.
Figure 6:
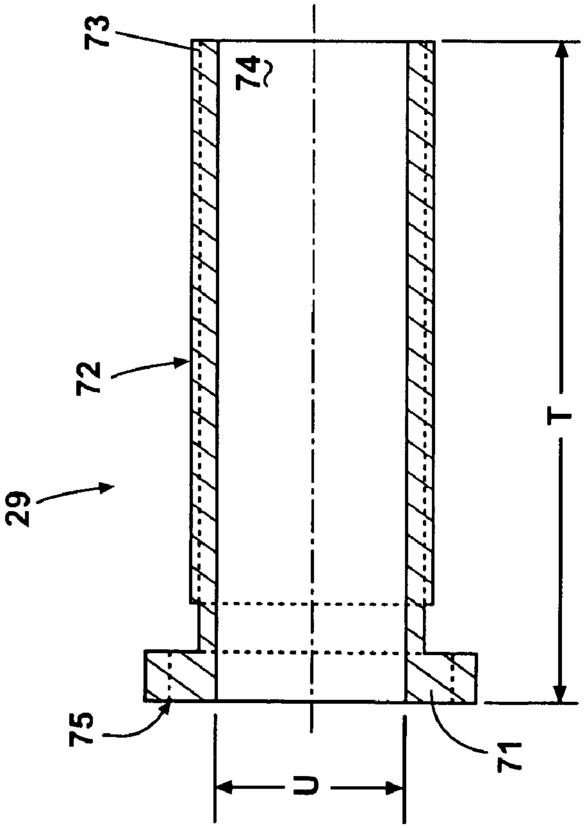
FIG. 6 is a cross sectional front elevational view of a stop member of the present disclosure.

Referring now generally to FIGS. 6 and 7, stop 29 includes a stop flange 71 homogenously joined to a tubular body 73 having a plurality of external threads 72 created throughout a substantial length of tubular body 73, except at stop flange 71, the external threads 72 being engageable with the internal threads of stop regulator 42. A sleeve clearance aperture 74 rotatably receives sleeve 26 defining a smooth wall through aperture adapted to receive sleeve 26 for both axial and rotatable non-restricted sleeve displacement. A stop face 75 of stop flange 71 has a stop face diameter "W". The combination of opposed first and second male keys 30, 31 define a total key spacing "V" which permit the first and second male keys to be slidably received within the corresponding first and second key slots 32, 33 of adapter 24. First and second male keys 30, 31 prevent rotation of stop 29 while allowing axial/longitudinal displacement of stop 29 in response to rotation of stop regulator 42. A stop total length "T" and a stop through-bore diameter "U" are sized to determine a maximum longitudinal displacement of mandrel 36 and to provide rotation clearance respectively for sleeve 26.

Figure 10:
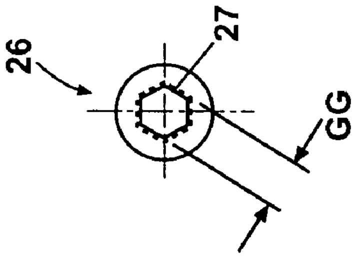
FIG. 10 is a second end elevational view of the sleeve of FIG. 8.
Figure 9:
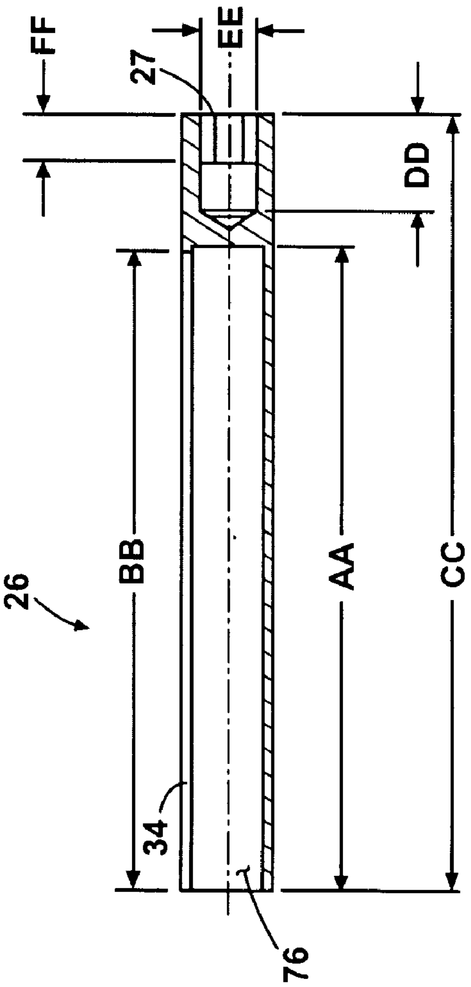
FIG. 9 is a cross sectional front elevational view taken at section 9-9 of FIG. 8.
Figure 8:
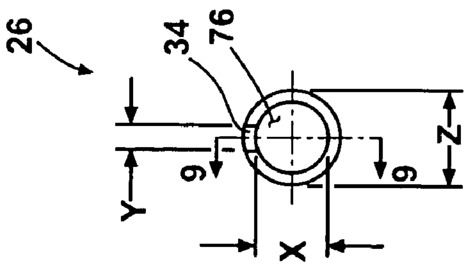
FIG. 8 is a first end elevational view of a sleeve of the present disclosure.

Referring now to FIGS. 8 through 10, sleeve 26 includes a sleeve internal bore 76 having a sleeve internal diameter "X". Pin slot 34 defines a slot width "Y" which is sized to slidably accept pin 35 of mandrel 36. Sleeve 26 has a sleeve outer diameter "Z" which is sized to be rotatably received by sleeve clearance aperture 74 of stop 29. Sleeve internal bore 76 defines a sleeve bore depth "AA" which is longer than a pin slot length "BB". The total sleeve length "CC" also provides for an engagement depth "DD" of mating connection 27. Mating connection 27 further includes a hex width "EE", a hex depth "FF", and a hex flat spacing dimension "GG" which correspond to a size and geometry of drive element 28 of tool 12.

Figure 12:
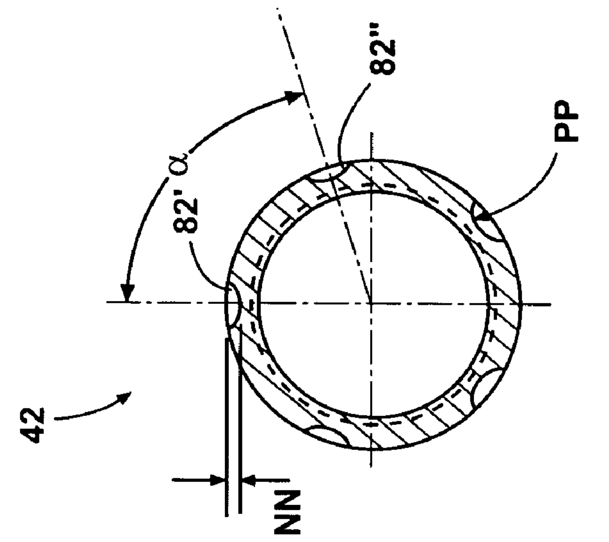
FIG. 12 is a cross sectional view taken at section 12-12 of FIG. 11.
Figure 11:
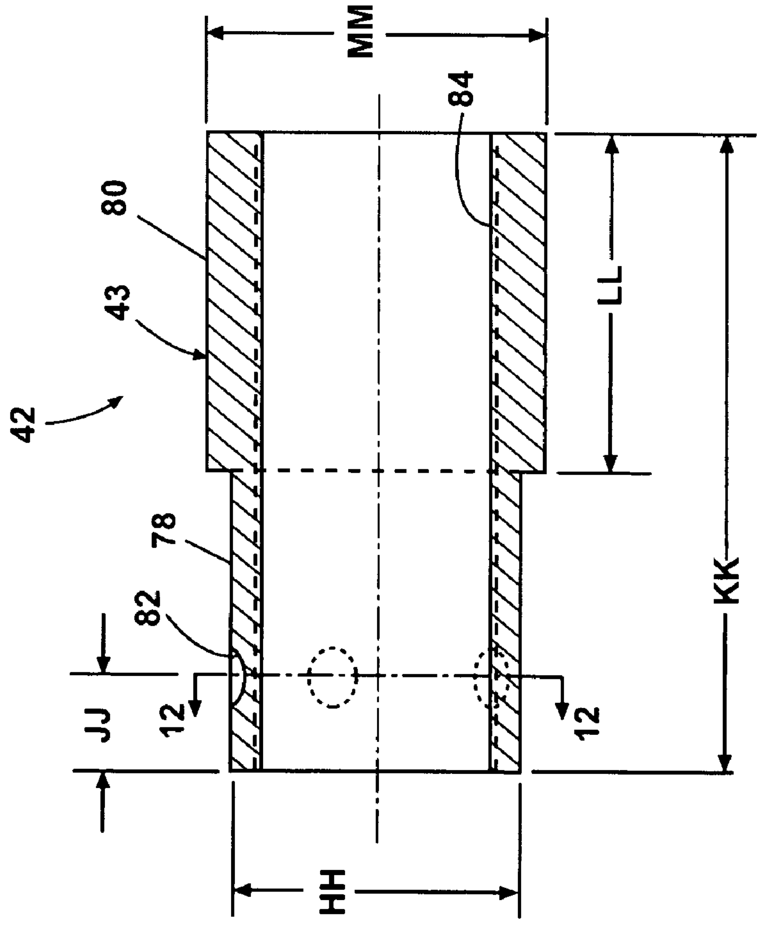
FIG. 11 is a cross sectional elevational view of a stop regulator of the present disclosure.

Referring now to FIGS. 11 and 12, stop regulator 42 includes a first tubular portion 78 having an outer diameter "HH" which is rotatably received in adapter 24 and is sized for rotatable clearance with stop regulator receiving diameter "Q" of adapter 24. A second tubular portion 80 having a second tubular portion diameter "MM" which is greater than outer diameter "HH" defines knurled outer diameter 43 having a knurled portion length "LL". A plurality of detent cavities 82 are created in first tubular portion 78 each spaced at a spacing dimension "JJ" from a free end of first tubular portion 78. Detent cavities 82 receive ball 44 or detent member 160 of a biasing ring 152 shown and described in reference to FIG. 22, to provide a plurality of predetermined stop distances for displacement of mandrel 36. The quantity of detent cavities 82 is determined by the installation distance that mandrel 36 is to be repositioned which correlates to a diameter of coiled insert 46. Spacing between detent cavities 82, for example between cavity 82' and cavity 82" is defined by an angle $\alpha$. Each of the detent cavities 82 have a cavity depth "NN" and a cavity radius "PP" which corresponds to a diameter of ball 44. The total length "KK" of stop regulator 42 according to several embodiments is approximately 1.66 in (4.22 cm). According to several embodiments, angle $\alpha$ is approximately 73° and an incremental advancement of mandrel 36 is approximately 0.010 in (0.025 cm) as stop regulator 42 is rotated between sequential engagement positions of ball 44 with detent cavities 82.

Figure 13:
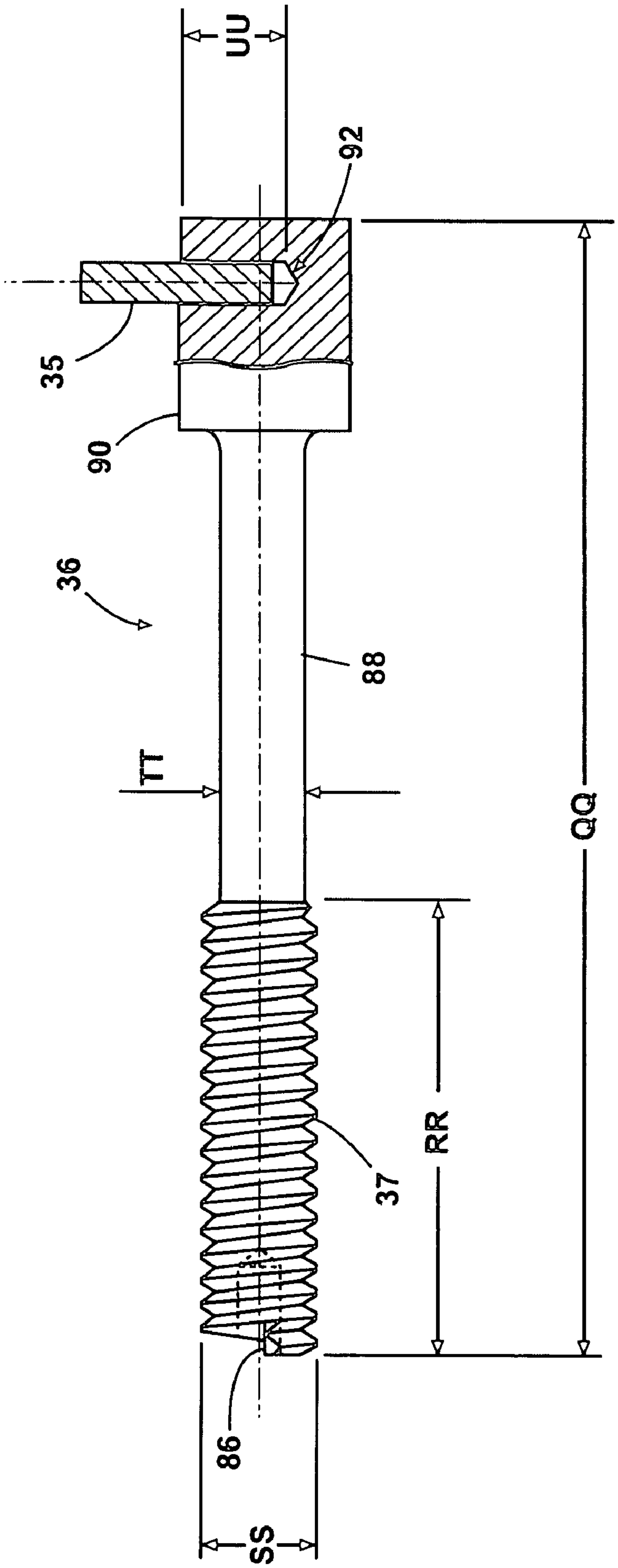
FIG. 13 is a partial cross sectional side elevational view of a mandrel and pin assembly of the present disclosure.

Referring now to FIG. 13, mandrel 36 according to several embodiments has a mandrel length "QQ" and a threaded end thread length "RR" as well as a thread diameter "SS". Mandrel length "QQ", thread length "RR", and thread diameter "SS" are selectable based at least on the size of the helical coil insert 46, the size and/or type of tool 12, and the depth of engagement $\delta$ of the insert. An engagement portion 86 can be provided at a distal end of threaded end 37 and used to engage a tang of coiled insert 46 when a tang is provided. Engagement portion 86 can be modified from that shown to adapt mandrel 36 for installation of tangless helical coil inserts 46. Mandrel 36 can also provide a body portion 88 having a diameter "TT" which can be smaller than thread diameter "SS" to allow full engagement of threaded end 37 to the necessary installation depth of coiled insert 46 without interference between body portion 88 and threaded portion 38 of pre-winder 39. A head 90 includes a pin aperture 92 having an aperture depth "UU" adapted to receive pin 35. Pin 35 can be engaged within pin aperture 92 by multiple processes, including by press fit, welding, soldering, brazing, and the like to prevent disengagement or removal of pin 35.

Figure 14:
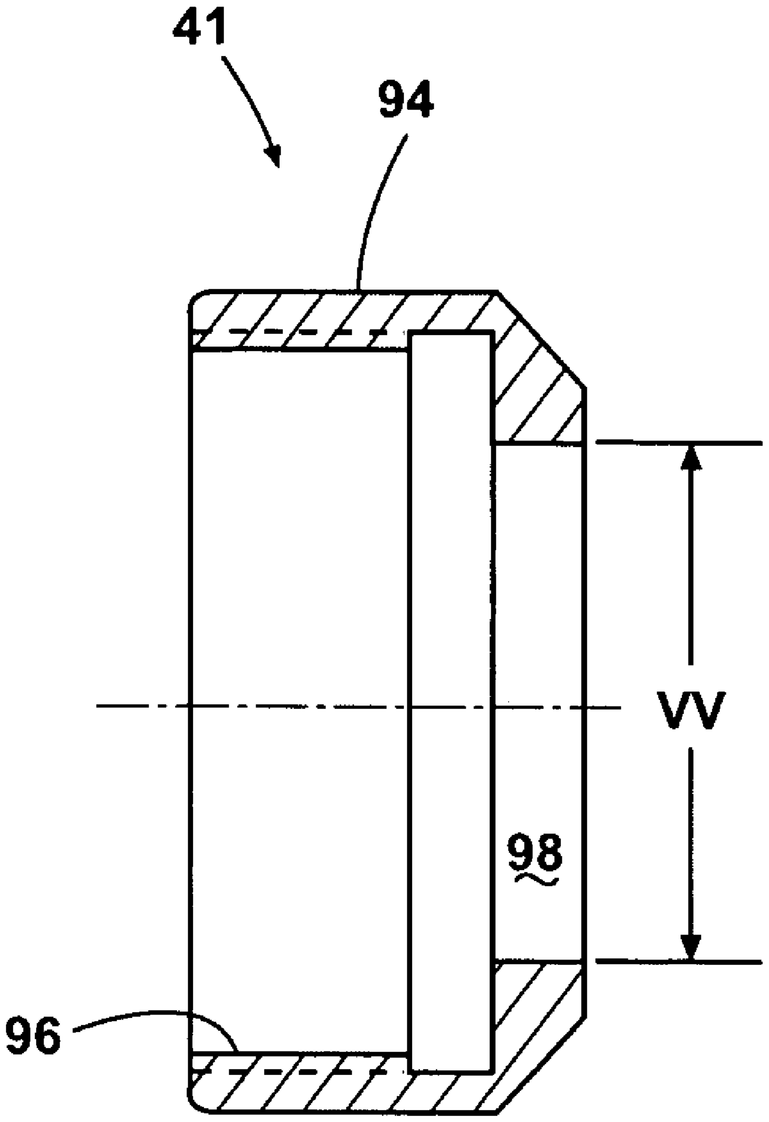
FIG. 14 is a cross sectional front elevational view of a coupling retainer of the present disclosure.

As best seen in reference to FIG. 14, in several embodiments coupling retainer 41 has a hex-shaped perimeter 94 adapted for engagement by a wrench or tool for installation of pre-winder 39 onto adapter 24. A plurality of engagement threads 96 engage the corresponding threads of coupling end 40 of adapter 24. A clearance aperture 98 having a clearance diameter "VV" is provided to slidingly receive pre-winder 39 prior to installation.

Figure 15:
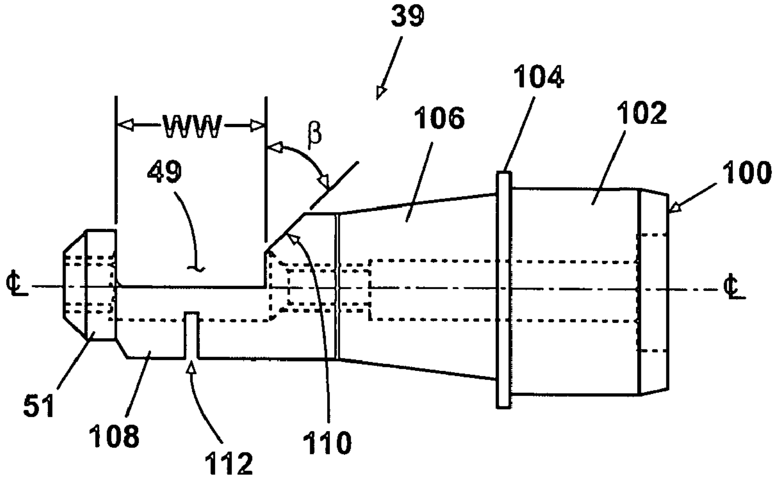
FIG. 15 is a front elevational view of a prewinder of the present disclosure.
Figure 16:
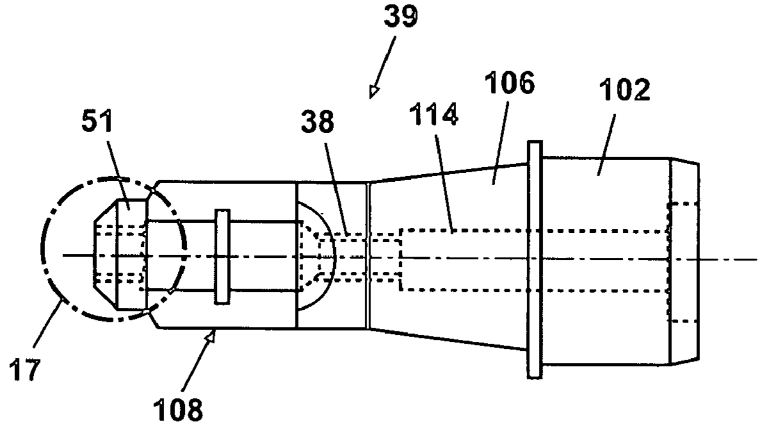
FIG. 16 is a bottom plan view of the prewinder of FIG. 15.
Figure 17:
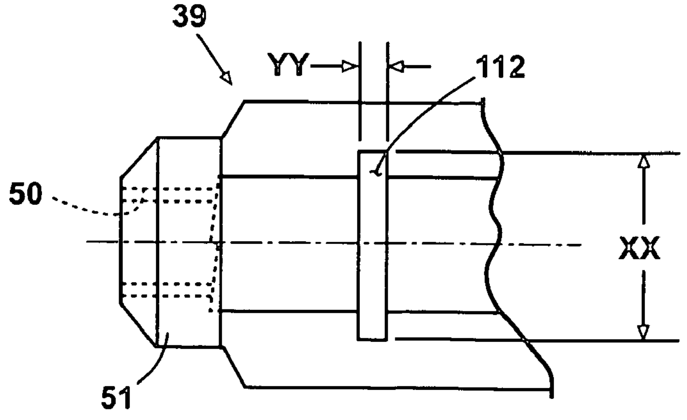
FIG. 17 is an exploded view taken at area 17 of FIG. 16.

Referring generally now to FIGS. 15 through 17, pre-winder 39 includes a contact end face 100 which abuts pre-winder abutting end 59 of adapter 24. A tubular mating end 102 is slidably received within clearance aperture 98 of coupling retainer 41. An engagement ring 104 radially extends outwardly from tubular mating end 102 and provides mating face for engagement by coupling retainer 41. A tapering portion 106 tapers away from engagement ring 104 to a smaller diameter coiled insert receiving portion 108. A chamfer 110 is provided leading into cavity 49 to assist loading coiled inserts 46 into cavity 49. A slot 112 can be provided in coiled insert receiving portion 108 which is adapted to receive a tape having a plurality of coiled inserts 46 disposed thereon for automatic operation of pre-winder/tool 10.

A clearance bore 114 is provided throughout tubular mating end 102 and substantially throughout tapering portion 106 and opens into a threaded bore 116 having a smaller diameter than clearance bore 114. Threaded bore 116 defines threaded portion 38 of pre-winder 39 and engages threaded end 37 of mandrel 36. Threaded portion 38 opens into cavity 49 and is co-axially aligned with coil reducing aperture 50 of coil reducer member 51. According to several embodiments, chamfer 110 is created at an angle $\beta$ to support installation of coiled inserts 46 into cavity 49. Cavity 49 includes a cavity length "WW" which is longer than a length of coiled inserts 46 allowing the operator to visually see the threaded end 37 of mandrel 36 extending through threaded portion 38 to visually align threaded end 37 with coiled insert 46. Slot 112 has a slot length "XX" and a slot width "YY" which are predetermined by the clearance necessary for the strip which supports the plurality of coiled inserts 46 for automatic operation of pre-winder/tool 10. Slot 112 can be eliminated where tape feed of pre-winder/tool 10 is not required.

Figure 18:
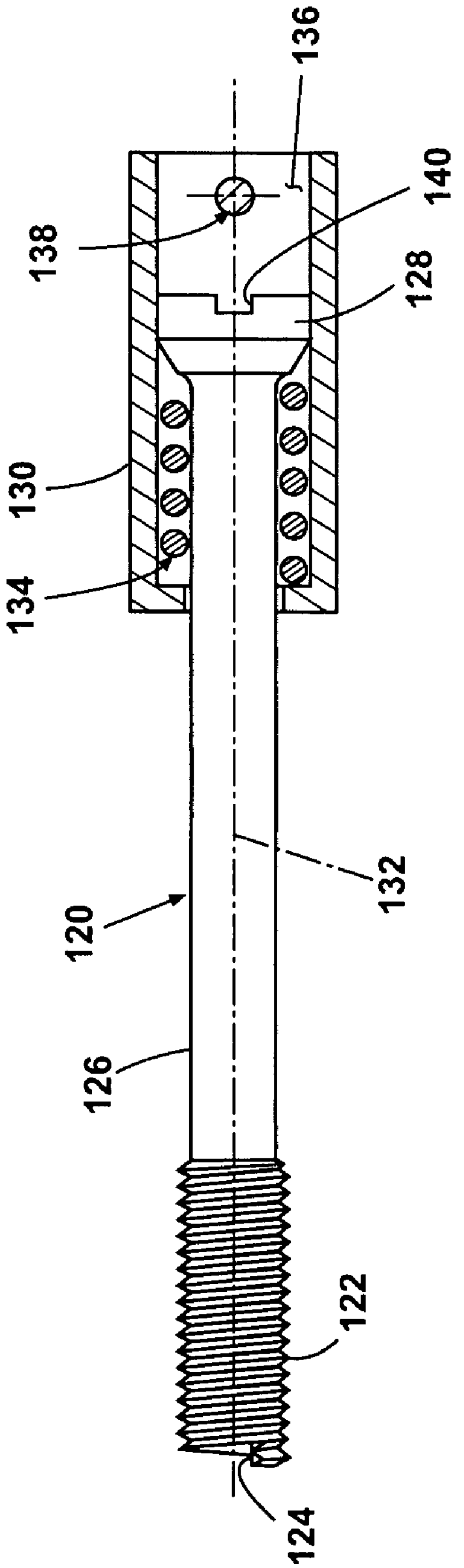
FIG. 18 is a partial cross sectional side elevational view of a mandrel assembly according several embodiments of the present disclosure.

Referring now to FIG. 18, according to several embodiments a mandrel 120 is modified from mandrel 36 to eliminate the connection of pin 35 directly to mandrel 120. Mandrel 120 includes a threaded end 122 similar to threaded end 37 and can also include an engagement portion 124 similar to engagement portion 86. A body portion 126 is created similar to body portion 88 of mandrel 36. Mandrel 120 differs from mandrel 36 by the use of a piston end 128 which is slidably received within a cylinder 130. Mandrel 120 is slidably disposed with respect to cylinder 130 along a common longitudinal axis 132 and is biased to return from an extended or driven position compressing a biasing element 134 to the position shown having biasing element 134 expanded. In several embodiments biasing element 134 can be a coiled metallic spring.

Piston end 128 is slidably disposed within a cylinder bore 136 of cylinder 130. A pin 138 which is similar to pin 35 is engaged in a corresponding aperture of cylinder 130 and performs a similar function to pin 35. A slot 140 of piston end 128 can be provided to receive a corresponding male element (not shown) of the drive element of tool 12. A total depth of installation of coiled inserts 46 using mandrel 120 can be in part determined by a depth of engagement of the drive element with slot 140 when piston end 128 extends away from the drive element of tool 12. When the drive element disengages from slot 140, biasing element 134 returns piston end 128 toward the right as viewed in FIG. 18 until slotted end 140 is again engaged by the drive element of tool 12. The assembly of mandrel 120 and cylinder 130 can therefore function similar to a clutch during installation of coiled inserts 46 if tool 12 is not otherwise provided with a similar clutch mechanism.

Figure 19:
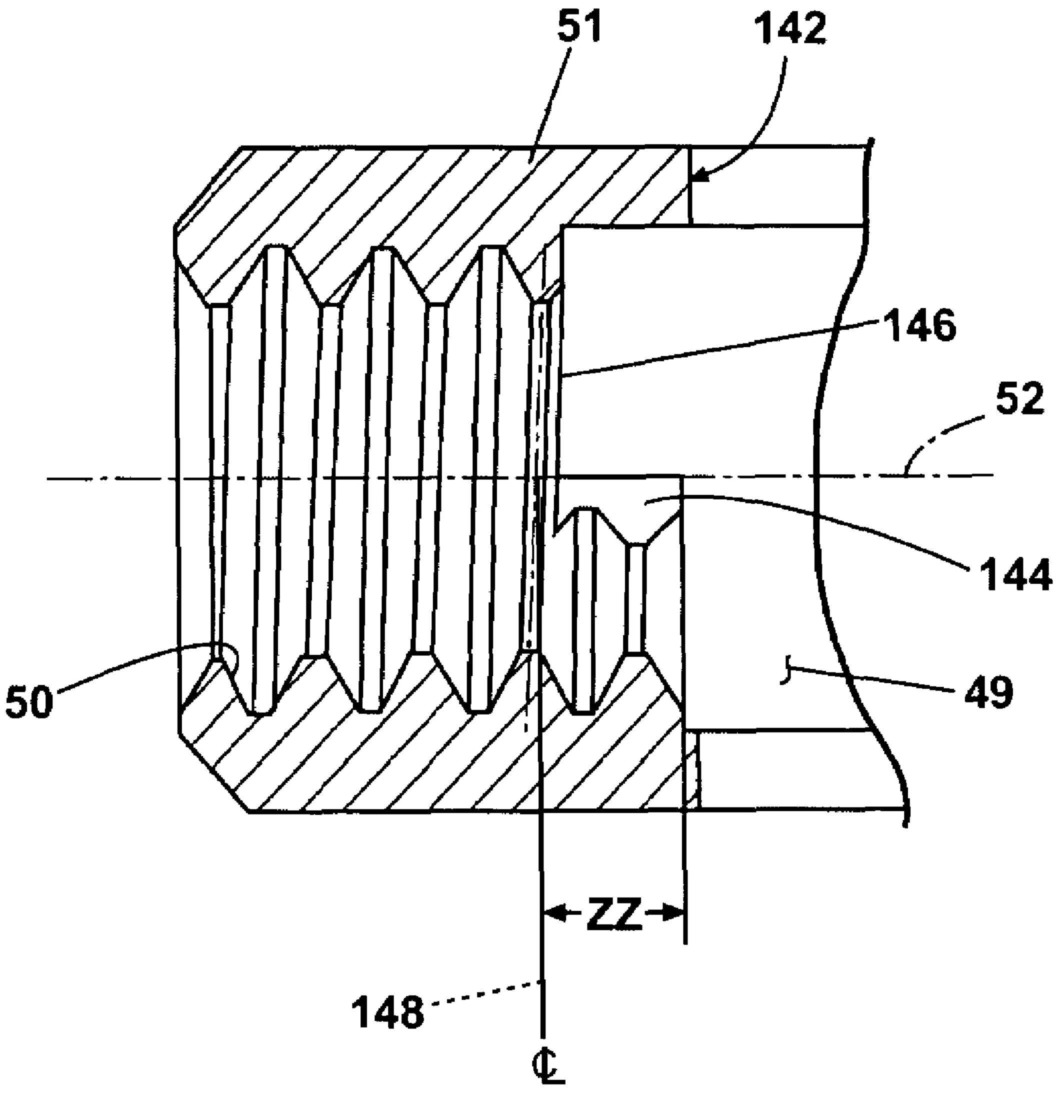
FIG. 19 is a cross sectional side elevational view of a coil reducer member of the present disclosure.

Referring now generally to FIG. 19, the thread geometry at coil reducing aperture 50 of coil reducer member 51 is selected to achieve optimum engagement of helically coiled insert 46 by mandrel 36. When helically coiled insert 46 is pre-positioned in cavity 49, the insert is retained proximate an end wall 142. A partial thread 144 is created proximate end wall 142 which transitions into a full thread section 146 at a thread centerline 148 and at a distance "ZZ". Partial thread 144 helps align helically coiled insert 46 on longitudinal axis 52 to minimize cross threading of helically coiled inserts 46.

Figure 20:
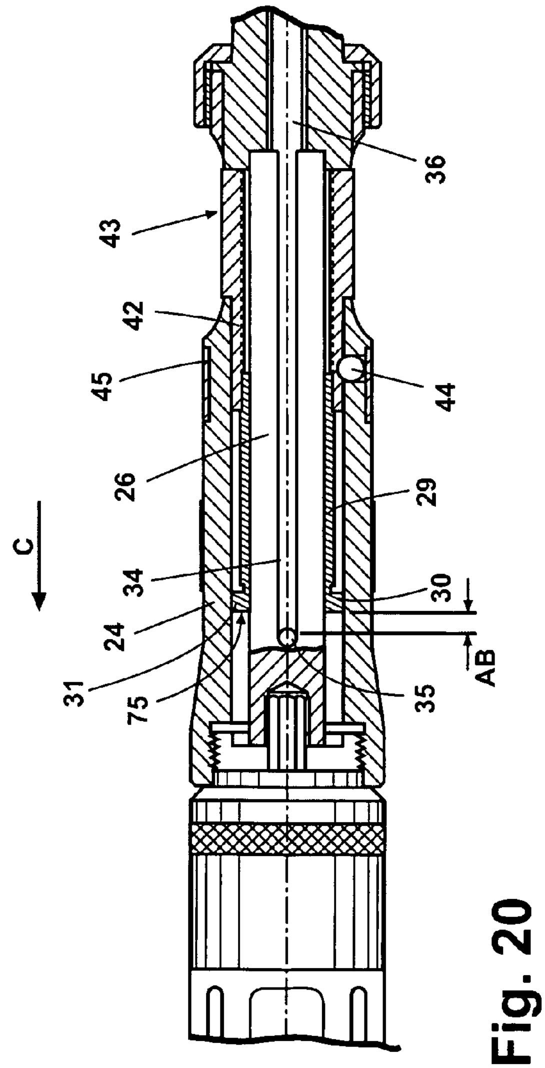
FIG. 20 is an enlarged partial cross sectional view of the adapter of FIG. 1.

Referring now generally to FIG. 20, the minimum range of travel of mandrel 36 relative to an end face of coil reducer member 51 is identified as a distance "AB" between pin 35 and the stop face 75 of stop 29. The initial position shown for pin 35 is reached by reversing operation of tool 12 to rotate sleeve 26 and thereby mandrel 36 by engagement of pin 35 in pin slot 34, axially translating mandrel 36 in the tool retraction direction "C" as threaded end 37 of mandrel 36 engages threaded portion 38 of prewinder 39. The initial position of pin 35 is established when pin 35 contacts an end wall of sleeve 26 defining a closed end of slot 34. Tool 12 can be provided with a clutch or similar stopping device to stop or stall operation of tool 12 when the initial position is reached. If tool automatic reversal is provided, tool 12 is then ready to receive a helical insert 46 in cavity 49. If automatic reversal is not provided and direction selector 23 is provided, direction selector 23 can be displaced to prepare for installation of a new helical insert 46. Distance "AB" is thereafter minimized as shown when knurled outer diameter 43 of stop regulator 42 is manually engaged and rotated to displace stop 29 by engaging continuous inner thread 84 of stop regulator 42 with external thread 72 of stop 29 to displace stop 29 in the tool retraction direction "C".

Figure 21:
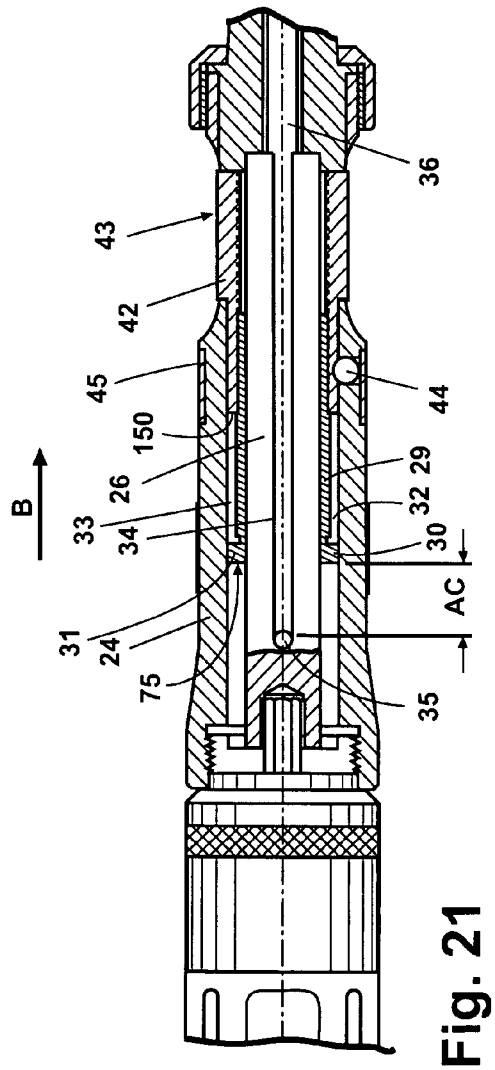
FIG. 21 is a partial cross sectional view similar to FIG. 20, showing an advanced stop position.

Referring now in general to FIG. 21, an increased range of travel of mandrel 36 relative to an end face of coil reducer member 51 is defined as a mandrel travel distance "AC" between pin 35 and the stop face 75 of stop 29. Travel distance "AC" defines the depth of engagement δ of helically coiled insert 46 into receiving part 48. Travel distance "AC" is selected by the operator when knurled outer diameter 43 of stop regulator 42 is manually engaged and rotated to displace stop 29 to engage continuous inner thread 84 of stop regulator 42 with external thread 72 of stop 29 to displace stop 29 in the tool engagement direction "B". Thereafter, when tool 12 is operated to translate mandrel 36 in the tool advancing direction "B" and mandrel 36 rotates through threaded portion 38 and the coil reducing aperture 50, mandrel 36 axially extends in the tool advancing direction "B" beyond coil reducer member 51 until pin 35 contacts stop face 75 at the new position of stop 29. The range of travel of mandrel 36 is therefore determined by the difference between travel distance "AC" and distance "AB". A maximum possible travel distance "AC" is defined when first and second male keys 30, 31 contact an end face 150 of stop regulator 42. The extension of mandrel 36 is therefore infinitely adjustable between distance "AB" and the maximum travel distance "AC" by rotation of stop regulator 42 for substantially the total length of stop 29.

Figure 3:
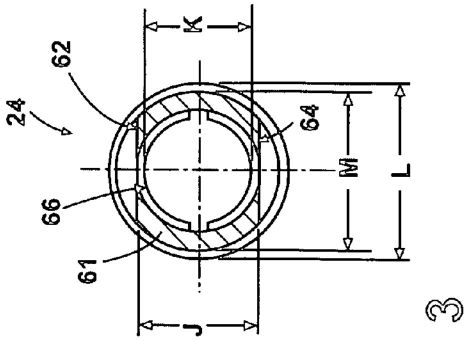
FIG. 3 is a cross sectional side view taken at section 3-3 of FIG. 2.
Figure 5:
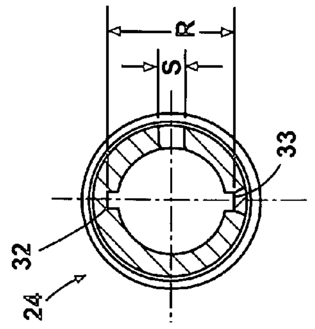
FIG. 5 is a cross sectional side view taken at section 5-5 of FIG. 4.
Figure 2:
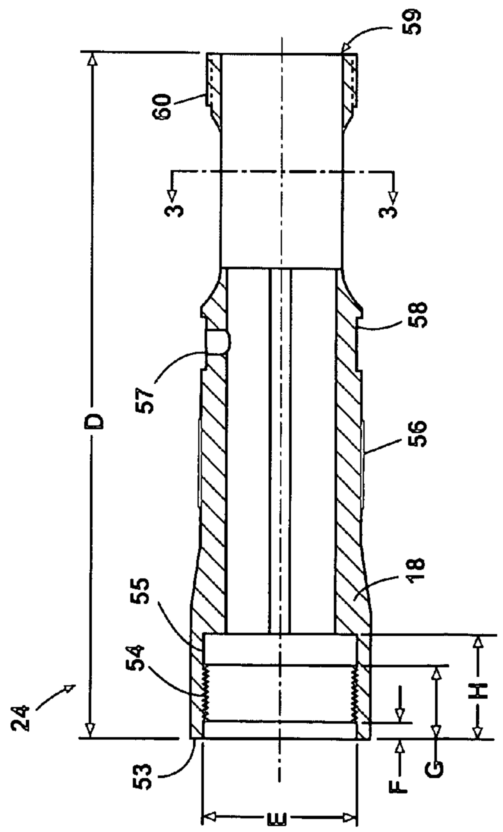
FIG. 2 is a cross sectional front elevational view of an adapter of the present disclosure.
Figure 4:
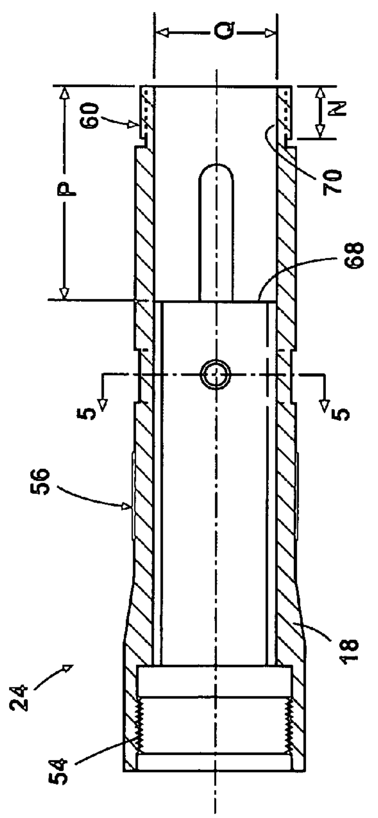
FIG. 4 is a cross sectional top elevational view of the adapter of FIG. 2.
Figure 22:
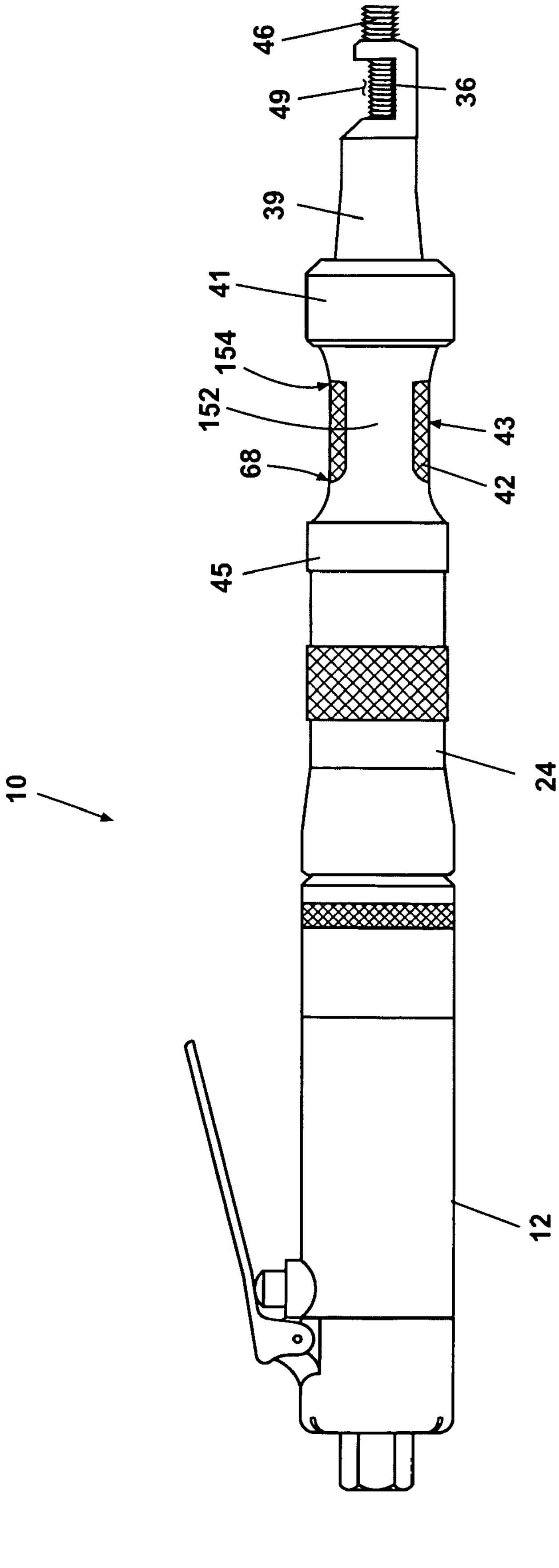
FIG. 22 is a perspective view of the adjustable prewinder assembly of FIG. 1.
Figure 23:
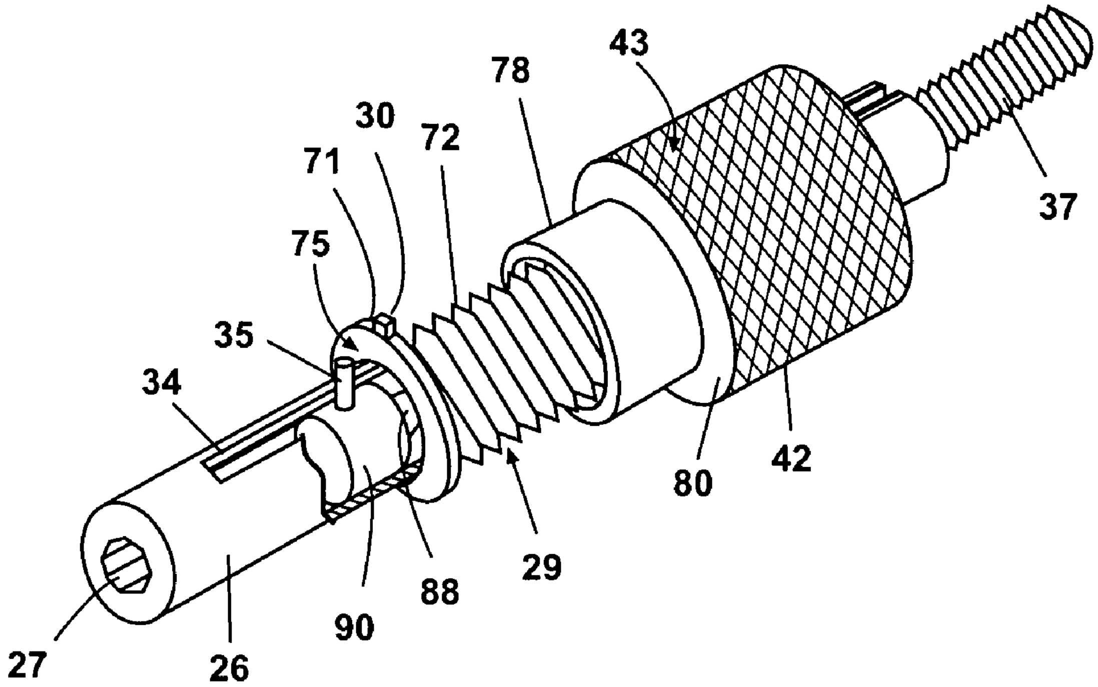
FIG. 23 is a partial cross sectional perspective view of an assembly of the mandrel, sleeve, stop, and stop regulator of the present disclosure.

Referring now to FIGS. 3, 22 and 23, to adjust the displacement of mandrel 36 to adjust the depth of insertion of helical inserts 46, the knurled face(s) 43 of stop regulator 42 is/are manually grasped and stop regulator 42 is rotated. A portion of knurled face 43 of second tubular portion 80 extends outwardly from adapter 24 through each of the window openings 62, 64 of adapter 24 which are created by eliminating or removing material from an outer wall 152. Stop regulator 42 can be rotated within the window openings 62, 64, but is restricted from axial displacement by first end face 68 and a second end face 154 defined at opposed ends of both window openings 62, 64. Stop regulator 42 is rotated to engage the external threads 72 of stop 29, which axially displaces stop 29. As previously noted, stop 29 is prevented from rotating within adapter 24 by first and second male keys 30, 31 (only first male key 30 is visible in FIG. 23) therefore the rotational force of stop regulator 42 is converted to axial displacement of stop 29. This predetermines the axial position of flange 71 and stop face 75. When sleeve 26 is thereafter rotated by tool 12, the longitudinal slot 34 engages pin 35 extending from second end 90 of mandrel 36, to rotate mandrel 36. Mandrel 36 axially translates until pin 35 contacts engagement face 75. As mandrel 36 is rotated by tool 12, because sleeve 26 has a smooth outer diameter received within stop 29, and because stop 29 is otherwise prevented from rotating by first and second male keys 30, 31 stop 29 cannot rotate, and therefore stop regulator 42 cannot rotate.

Figure 24:
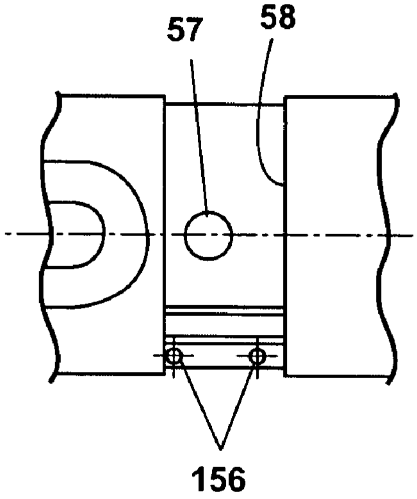
FIG. 24 is a partial side elevational view of the adapter of FIG. 1.
Figure 25:
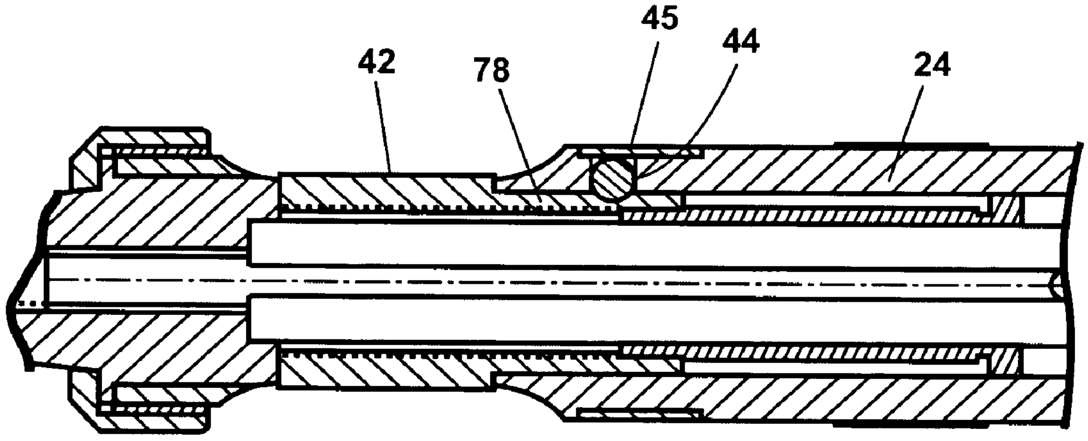
FIG. 25 is a partial cross sectional side elevational view of the biasing ring, ball, and stop regulator of FIG. 1.

Referring now to FIGS. 24 and 25, in several embodiments biasing ring 45 which is positioned within recess 58 abuts ball 44 and biases ball 44 into engagement with one of the plurality of detent cavities 82 in first tubular portion 78 of stop regulator 42. Biasing ring 45 can also be modified to receive one or more fasteners (not shown) received through biasing ring 45 and fastened in respective ones of apertures 156 created in the remaining wall thickness of recess 58.

Figure 26:
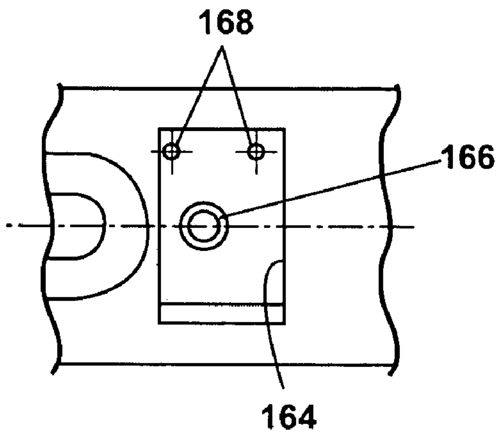
FIG. 26 is a partial side elevational view of another embodiment of an adapter having a semi-circular biasing ring recess.
Figure 27:
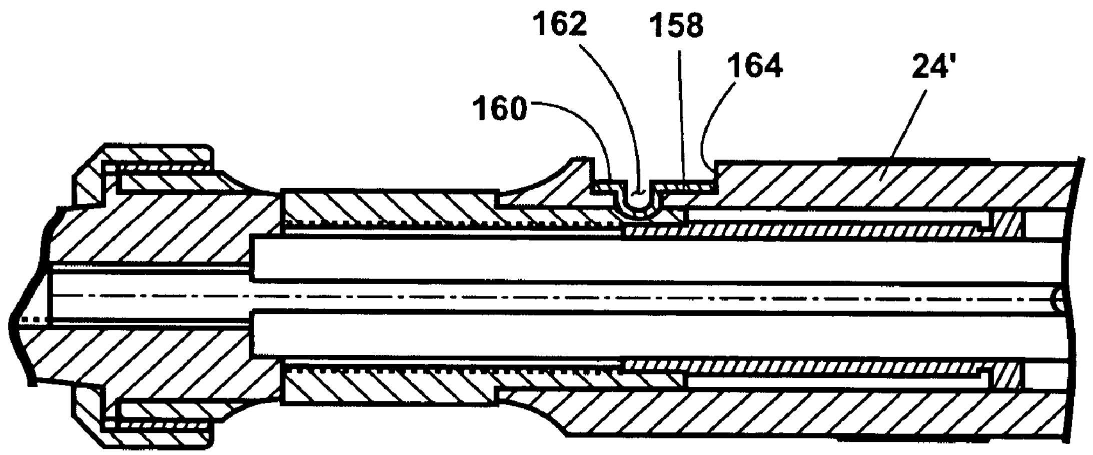
FIG. 27 is a partial cross sectional side elevational view of a semi-circular biasing ring having a male detent member adapted to be received in the semi-circular biasing ring recess of FIG. 26.

Referring now to FIGS. 26 and 27, in several embodiments, a biasing ring 158 is modified from biasing ring 45. Biasing ring 158 includes a semi-circular body 160 having a male detent member 162 which temporarily engages one of the plurality of detent cavities 82 of stop regulator 42. Semi-circular body 160 is received in a semi-circular recess 164 created in a modified adapter 24'. An aperture 166 is created in the remaining wall of semi-circular recess 164 which receives male detent member 162 facing toward an interior portion of modified adapter 24'. Male detent member 162 replaces ball 44 and is therefore similarly shaped to engage within any of the detent cavities 82 of stop regulator 42. Biasing ring 158 can also be modified to receive one or more fasteners (not shown) received through biasing ring 158 and fastened in respective ones of apertures 168 created in the remaining wall thickness of semi-circular recess 164 to fasten biasing ring 158 to modified adapter 24'.

Pre-winder assembly 11 of the present disclosure offers several advantages. Pre-winder assembly 11 can be adapted to threadably engage with the tool and abut a tool end, providing a rigid connection with the tool. A mandrel within the pre-winder assembly engages the coiled insert and can be substantially infinitely adjustable in either of a tool advancing direction or a retraction direction within a depth range of coiled insert installation. The pre-winder assembly also includes a knurled rotatable stop regulator that permits the depth adjustment by manual rotation of the stop regulator. Previous pre-winders required the use of shims or sleeves which are installed after disassembling the pre-winder from the tool and must be sized by trial and error to adjust the mandrel extension and thereby the coil installation depth within the threaded aperture of the receiving part. Other common pre-winder designs use multiple fasteners and/or couplers connected to the mandrel which require an additional tool or several tools to release the fasteners, move the mandrel, and then retighten the couplers. The present disclosure requires no additional tools to provide the depth adjustment for the mandrel. The present disclosure further provides a ball which is biased by a biasing ring coupled about the adapter body. The ball engages in multiple detent cups or grooves positioned opposite to the knurled end of the stop regulator about a first tubular portion of the stop regulator. Engagement of the ball in individual ones of the detent cups signifies to the operator a predetermined advancement of the mandrel, for example, an advancement of approximately 0.010 in (0.25 cm). A pin fixed to an end of the mandrel sliding in a pin slot of a sleeve which strikes a stop determines the total travel distance of the mandrel. The pre-winder therefore does not require any disassembly or reassembly to provide mandrel depth adjustment.

What is claimed is:

1. A prewinder apparatus selectively attachable to a drive tool for installation of a helical coil insert, the prewinder apparatus comprising:

an adapter member attachable to the drive tool having at least one window opening;

a stop regulator having:

a first tubular portion adapted to be slidably received within the adapter member and rotatable with respect to the adapter member;

a second tubular portion having a diameter larger than a first tubular portion diameter and extending outwardly through the at least one window opening to permit manual contact with an outer face of the second tubular portion to manually rotate the stop regulator;

first and second end faces of the second tubular portion that are both axially restrained and rotatably disposed within the adapter member;

an axial threaded through aperture; and opposed edges defined by the window opening, the opposed edges operating to independently contact one of the first and second end faces of the second tubular portion to prevent axial displacement of the stop regulator with respect to the adapter member; and a stop member having a flange defining a stop face, a tubular body extending from the flange having continuous external threading, and a smooth wall internal aperture extending throughout a stop member length, the external threading engageable in the threaded through aperture of the stop regulator permitting infinitely adjustable axial displacement of the stop member throughout a tubular body length by manual rotation of the stop regulator;

a tubular sleeve rotatably disposed in the internal aperture and adapted to engage a drive element of the tool, the tubular sleeve including a hollow portion having a longitudinal slot; and a mandrel slidably disposed within the hollow portion of the sleeve having a threaded first end adapted to engage the helical coil insert and a second end, the second end having a transversely extending pin slidably received in the longitudinal slot, the mandrel co-rotatable with the tubular sleeve and axially displaceable until the pin contacts the stop face defining a selectable displacement of the threaded first end.

2. The prewinder apparatus of claim 1, wherein the first tubular portion of the stop regulator further includes at least one detent cavity.

3. The prewinder apparatus of claim 2, wherein the at least one detent cavity comprises a plurality of detent cavities each spaced about the first tubular portion from a proximate one of the detent cavities by a predetermined angle.

4. The prewinder apparatus of claim 2, further comprising a ball disposed in a ball receiving cavity of the adapter member, the ball biased for releasable engagement into individual ones of the detent cavities each corresponding to an incremental axial displacement of the stop.

5. The prewinder apparatus of claim 4, further comprising a biasing ring at least partially circumferentially disposed on the adapter member proximate to the ball and operable to releasably bias the ball into individual ones of the detent cavities.

6. The prewinder apparatus of claim 2, further comprising a biasing ring at least partially circumferentially disposed on the adapter member proximate to the detent cavities, the biasing ring including a male detent member releasably engageable with individual ones of the detent cavities.

7. The prewinder apparatus of claim 1, wherein the at least one window opening further comprises opposed first and second window openings each having a portion of the second tubular portion of the stop regulator partially extending through the first and second window openings allowing access for manual rotation of the stop regulator.

8. The prewinder apparatus of claim 1, further comprising a knurled outer face created on the second tubular portion of the stop regulator, the knurled outer face being accessible through the at least one window opening to manually grasp the stop regulator.

9. A prewinder apparatus selectively attachable to a drive tool for prewinding a helical coil insert, the prewinder apparatus comprising:

an adapter member attachable to the drive tool having a window opening including opposed edges;

a prewinder attached to an end of the adapter member, the prewinder including first and second threaded apertures;

a sleeve rotatably disposed in the adapter member having an engagement end adapted to engage a drive element of the drive tool and opposed engagement walls defined by a longitudinal slot extending away from the engagement end; and a mandrel having a threaded first end and a pin transversely extending from a second end, the threaded end threadably engaged in the first threaded aperture and longitudinally displaceable through the second threaded aperture by rotation of the mandrel, the mandrel positioned within the sleeve and rotatable by engagement of the pin with one of the engagement walls of the sleeve;

a stop member disposed in the adapter and adapted to rotatably receive the sleeve, the stop member having a plurality of external threads and a flange defining a stop face; and a stop regulator having a first tubular portion rotatably disposed in the adapter member and a second tubular portion having first and second end faces extending diametrically outwardly through the window opening, and having internal threads engageable with the external threads of the stop member, the stop member longitudinally displaceable by manual rotation of the stop regulator by contact between one of the first or second end faces of the second tubular portion of the stop regulator and one of the first or second edges of the window opening such that a rotational force of the stop regulator is converted to an axial displacement of the stop member, engaging the external threads of the stop member without detaching the adapter from the drive tool;

wherein an axial displacement of the mandrel is predetermined by rotation of the stop regulator engaging the threads of the stop member to axially displace the stop face, contact between the pin and the stop face defining an insertion depth of the helical coil insert.

10. The prewinder apparatus of claim 9, wherein the first tubular portion of the stop regulator further includes at least one detent cavity.

11. The prewinder apparatus of claim 10, wherein the at least one detent cavity comprises a plurality of detent cavities each spaced about the first tubular portion from a proximate one of the detent cavities by a predetermined angle.

12. The prewinder apparatus of claim 11, further comprising a ball disposed in a cavity of the adapter member, the ball biased for releasable engagement into individual ones of the detent cavities corresponding to an incremental displacement of the stop member.

13. A prewinder apparatus selectively attachable to a drive tool for installation of a helical coil insert, the prewinder apparatus comprising:

an adapter member connected to the drive tool and having a window opening;

a stop regulator having:

a first tubular portion adapted to be entirely slidably received within a receiving bore of the adapter member and rotatable with respect to the adapter member;

a second tubular portion having a diameter larger than a first tubular portion diameter and first and second end faces, the second tubular portion including the first and second end faces partially extending outwardly through the window opening to permit manual contact with an outer face of the second tubular portion to manually rotate the stop regulator;

opposed edges defined by the window opening, the opposed edges each positioned to independently contact with one of the first and second end faces to restrain stop regulator axial displacement with respect to the adapter member; and an axial threaded through aperture; and a stop member having a flange defining a stop face, a tubular body extending from the flange having continuous external threading, and a smooth wall internal aperture extending throughout a stop member length, the external threading engaged in the threaded through aperture permitting stop member infinite adjustable axial displacement throughout a stop member tubular body length such that a rotational force of the stop regulator is converted to an axial displacement of the stop member.

14. The prewinder apparatus of claim 13, further comprising a tubular sleeve rotatably disposed in the internal aperture and adapted to engage a drive element of the tool, the tubular sleeve including a hollow portion having a longitudinal slot.

15. The prewinder apparatus of claim 14, further comprising a mandrel slidably disposed within the hollow portion of the sleeve having a threaded first end adapted to engage the helical coil insert.

16. The prewinder apparatus of claim 15, wherein the mandrel further includes a second end, the second end having a transversely extending pin slidably received in the longitudinal slot, the mandrel co-rotatable with the tubular sleeve and axially displaceable until the pin contacts the stop face defining a selectable displacement of the threaded first end.

* * * * *